3,344,149
SYNTHESIS OF STEROIDS
Patrick A. Diassi, Westfield, N.J., assignor, by mesne assignments, to E. R. Squibb & Sons, Inc., New York, N.Y., a corporation of Delaware
No Drawing. Original application Feb. 3, 1964, Ser. No. 342,263, now Patent No. 3,278,556, dated Oct. 11, 1966. Divided and this application Mar. 9, 1966, Ser. No. 532,850
1 Claim. (Cl. 260—343.2)

This application is a divisional application of U.S. application, Serial No. 342,263, filed February 3, 1964, now having matured to U.S. 3,278,556.

This invention relates to the provision of novel physiologically active compounds and more particularly to a compound of the formula

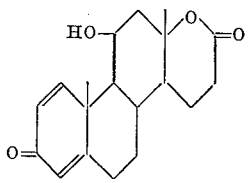

The compound of this invention is a physiologically active substance which possesses protein anabolic activity and may be used in the treatment of underweight patients, for example, to effect the rapid build-up of protein stores.

The compound of this invention is prepared according to the novel process of this invention by reducing 11-keto-$\Delta^1$-dehydrotestololactone, as by treatment with lithium tri-t-butoxy aluminum hydride to yield 11$\beta$-hydroxy-$\Delta^1$-dehydrotestololactone.

The invention may be further illustrated by the following example:

EXAMPLE

*11$\beta$-hydroxy-$\Delta^1$-dehydrotestololactone*

To a solution of 170 mg. of 11-keto-$\Delta^1$-dehydrotestololactone in 25 ml. of tetrahydrofuran, freshly distilled from lithium aluminum hydride, 340 mg. of lithium tri-t-butoxy aluminum hydride are added and the mixture stirred under nitrogen at room temperature for twenty-four hours. The reaction mixture is then carefully diluted with 50 ml. of 10% acetic acid and extracted with chloroform. The chloroform extracts are washed with water, dried over sodium sulfate, and evaporated to dryness. Crystallization of the residue from methanol gives 136 mg. of 11$\beta$-hydroxy-$\Delta^1$-dehydrotestololactone having a melting point 238–240°, $[\alpha]_D^{22}$ −37° (chf.);

$$\lambda_{max.}^{alc.}$$

241 m$\mu$ ($\epsilon$ 17,200).

*Analysis.*—Calc'd for $C_{19}H_{24}O_4$ (316.38): C, 72.12; H, 7.65. Found: C, 72.03; H, 7.79.

The invention may be variously otherwise embodied within the scope of the appended claim.

What is claimed is:

A process for preparing 11$\beta$-hydroxy-$\Delta^1$-dehydrotestololactone which comprises reacting 11-keto-$\Delta^1$-dehydrotestololactone with lithium tri-t-butoxy aluminum hydride.

References Cited

UNITED STATES PATENTS

| | | | |
|---|---|---|---|
| 2,855,404 | 10/1958 | Richards | 260—343.2 |
| 2,946,807 | 7/1960 | Fried et al. | 260—343.2 |
| 3,258,470 | 6/1966 | Cross | 260—343.2 |

OTHER REFERENCES

Herr et al., Jour. Amer. Chem. Soc., volume 75 (1953), pages 5927 to 5930.

Herr et al., Jour. Amer. Chem. Soc., volume 78 (1956), pages 500 to 501.

WALTER A. MODANCE, *Primary Examiner.*

J. PATTEN, *Assistant Examiner.*